(12) United States Patent
Kasemsuwan et al.

(10) Patent No.: US 12,414,581 B2
(45) Date of Patent: Sep. 16, 2025

(54) COMBINATORIAL METHODS OF HIGH PRESSURE AND TEMPERATURE PROCESS (HPTP) FOR PRODUCING TEXTURIZED MEAT PRODUCTS AND THE IMPROVED MEAT PRODUCTS OBTAINED FROM THE METHODS THEREOF

(71) Applicant: THAI UNION GROUP PUBLIC COMPANY LIMITED, Samutsakorn (TH)

(72) Inventors: Tunyawat Kasemsuwan, Bangkok (TH); Waraporn Kumkanokrat, Bangkok (TH); Kai Knoerzer, Werribee (AU); Sandra Olivier, Werribee (AU)

(73) Assignee: THAI UNION GROUP PUBLIC COMPANY LIMITED, Samutsakorn (TH)

( * ) Notice: Subject to any disclaimer, the term of this patent is extended or adjusted under 35 U.S.C. 154(b) by 386 days.

(21) Appl. No.: 15/766,725

(22) PCT Filed: Oct. 14, 2015

(86) PCT No.: PCT/TH2015/000071
§ 371 (c)(1),
(2) Date: Apr. 6, 2018

(87) PCT Pub. No.: WO2017/065700
PCT Pub. Date: Apr. 20, 2017

(65) Prior Publication Data
US 2018/0317531 A1  Nov. 8, 2018

(51) Int. Cl.
*A23L 13/60* (2016.01)
*A23B 2/10* (2025.01)
(Continued)

(52) U.S. Cl.
CPC .............. *A23L 13/60* (2016.08); *A23B 2/103* (2025.01); *A23J 3/22* (2013.01); *A23L 5/30* (2016.08);
(Continued)

(58) Field of Classification Search
CPC .......... A23L 13/60; A23L 17/00; A23L 13/00; A23L 13/50; A23L 3/0155; A23L 13/428;
(Continued)

(56) References Cited

U.S. PATENT DOCUMENTS 3,891,774 A * 6/1975 Baker ........................ A23J 3/26
426/802
6,017,572 A * 1/2000 Meyer ................ A23C 19/0973
426/521

(Continued)

FOREIGN PATENT DOCUMENTS

JP  1-153061 A  6/1989
JP  2-69162 A  3/1990
(Continued)

OTHER PUBLICATIONS

Kingsley, D.H. 2014. "High Pressure Processing of Bivalve Shellfish and HPP's use as a Virus Intervention." Foods. vol. 3, pp. 336-350.*

(Continued)

*Primary Examiner* — Vera Stulii
(74) *Attorney, Agent, or Firm* — Seed Intellectual Property Law Group LLP

(57) ABSTRACT

A method of preparing a meat product is disclosed. The method can comprise providing meat having a first texture, the first texture comprising a plurality of loosely-bound or unbound pieces of the meat. The meat with the first texture can be placed in a chamber. The temperature and the pressure in the chamber can be simultaneously increased to (Continued)

change the first texture to a second texture comprising a single unified body of meat, the second texture of the meat being sliceable.

22 Claims, 8 Drawing Sheets

(51) Int. Cl.
*A23J 3/22* (2006.01)
*A23L 5/30* (2016.01)
*A23L 13/00* (2016.01)
*A23L 13/40* (2023.01)
*A23L 13/50* (2016.01)
*A23L 17/00* (2016.01)

(52) U.S. Cl.
CPC .............. *A23L 13/00* (2016.08); *A23L 13/428* (2016.08); *A23L 13/50* (2016.08); *A23L 13/52* (2016.08); *A23L 17/00* (2016.08); *A23L 17/70* (2016.08)

(58) Field of Classification Search
CPC .. A23L 13/52; A23L 17/70; A23L 5/30; A23J 3/22; A23B 4/002
See application file for complete search history.

(56) References Cited

U.S. PATENT DOCUMENTS

| | | | |
|---|---|---|---|
| 6,086,936 A | 7/2000 | Wilson et al. | |
| 6,177,115 B1* | 1/2001 | Meyer | A23C 19/0973 426/521 |
| 6,207,215 B1* | 3/2001 | Wilson | A23B 4/0056 426/521 |
| 6,217,435 B1* | 4/2001 | Voisin | A22C 29/005 452/12 |
| 6,426,103 B2* | 7/2002 | Voisin | A22C 29/043 422/1 |
| 6,537,601 B1* | 3/2003 | Voisin | A22C 29/00 426/113 |
| 7,220,381 B2* | 5/2007 | Ting | A23L 3/0155 422/1 |
| 2007/0237865 A1* | 10/2007 | Love | B65B 25/06 426/129 |
| 2012/0269952 A1* | 10/2012 | Parker | A23L 13/60 426/641 |

FOREIGN PATENT DOCUMENTS

| | | |
|---|---|---|
| JP | 6-181719 A | 7/1994 |
| JP | 7-75508 A | 3/1995 |

OTHER PUBLICATIONS

Ramirez-Suarez, J.C., Morrissey, M.T. 2006. "Effect of high pressure processing (HPP) on shelf life of albacore tuna (*Thunnus alalunga*) minced muscle." Innovative Food Science and Emerging Technologies. vol. 7, pp. 19-27.*
Ohshima, T., Ushio, H., Koisumi, C. 1993. "High-pressure processing of fish and fish products." Trends in Food Science & Technology. Vo. 4, pp. 370-375.*
Kingsley, D.H., Kuhn, D.D., Flick, G.J., Oh, J., Lawson, L.S., Meade, G.K., Giesecke, C.G. 2014. "Desirability of Oysters Treated by High Pressure Processing at Different Temperatures and Elevated Pressures." Am. J. Food Technol., vol. 9, pp. 209-216.*
Cheah, P.B. Ledward, D.A. 1997. "Catalytic Mechanism of Lipid Oxidation following High Pressure Treatment in Pork Fat and Meat." J. Food Sci. vol. 6, pp. 1135-1138, 1141.*
Calik, H., Morrissey, M.T., Reno, P.W., An, H. 2002. "Effect of High-Pressure Processing on Vibrio parahaemolyticus Strains in Pure Culture and Pacific Oysters." Food Microbiology and Safety. vol. 67, pp. 1506-1510.*
International Search Report, mailed Apr. 12, 2016, for International Application No. PCT/TH2015/000071, 2 pages.
Juliano et al., "Descriptive Analysis of Precooked Egg Products After High- Pressure Processing Combined With Low and High Temperatures," *Journal of Food Quality* 29:505-530, 2006.
Kamalakanth et al., "Effect of high pressure on K-value, microbial and sensory characteristics of yellowfin tuna (Thunnus albacares) chunks in EVOH films during chill storage," *Innovative Food Science and Emerging Technologies* 12:451-455, 2011.
Matser et al., "Advantages of high pressure sterilisation on quality of food products," *Trends in Food Science & Technology* 15:79-85, 2004.
Okazaki et al., "Inactivation Behavior of Heat-Resistant Bacterial Spores by Thermal Treatments Combined with High Hydrostatic Pressure," *Food Sci. Technol. Res.*, 6(3):204-207, 2000.
Reddy et al., "Inactivation of *Clostridium botulinum* nonproteolytic type B spores by high pressure processing at moderate to elevated high temperatures," *Innovative Food Science and Emerging Technologies* 7:169-175, 2006.
Patazca et al., "Quasi-adiabatic temperature increase during high pressure processing of selected foods," Journal of Food Engineering 80:199-205, 2007 [Published online Jul. 3, 2006]. (7 pages).

* cited by examiner

_COMBINATORIAL METHODS OF HIGH PRESSURE AND TEMPERATURE PROCESS (HPTP) FOR PRODUCING TEXTURIZED MEAT PRODUCTS AND THE IMPROVED MEAT PRODUCTS OBTAINED FROM THE METHODS THEREOF_

FIELD OF THE INVENTION

The field relates to the combinatorial methods of high pressure and temperature process (HPTP) for producing texturized meat or seafood or fish or other similar meat products, and in particular tuna meat, for forming sliceable or cut-able meat or seafood or fish or other similar meat products from loosely-bound or unbound flakes of such meat.

DESCRIPTION OF THE RELATED ART

Conventional High Pressure Processing (HPP) methods and systems have been used in non-thermal processing techniques to sterilize or kill pathogenic and spoilage microorganisms in foods. Furthermore, chemical or biochemical reactions which occur in thermal processes of foods, especially protein based materials, (particularly low-temperature, long-time processes, or LTLT processes, such as canning) may lead to undesirable changes in color, flavor, and nutritional quality during processing and subsequent storage. While these processing techniques may be adequate for preservation of food i.e. microbial shelf-life extension, such processes typically produce meat products with characteristics which may not be desirable to consumers.

For example, in recent years, consumers' food preferences have been shifting towards fresher foods (e.g., foods with desirable characteristics i.e. color, texture and/or flavor), nutritious foods, and/or food products with other desirable qualities (such as convenience and/or compact packaging). Conventional processing techniques are unable to provide a high-quality meat product which is desirable to consumers yet which incorporates a wide variety of grades and/or types of meat, e.g., ingredient meats or constituted meats which may range from high to low quality and/or which may comprise different cuts and/or textures of meats.

Accordingly, there remains a continuing need for improved processes and systems for forming novel meat products with improved texture.

SUMMARY OF THE INVENTION

This invention relates to the combinatorial methods of high pressure and temperature process for producing texturized meat products and the improved meat products obtained from the methods thereof.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Specific implementations of the invention will now be described with reference to the following drawings, which are provided by way of example, and not limitation.

DETAILED DESCRIPTION OF THE INVENTION

Figure 1:
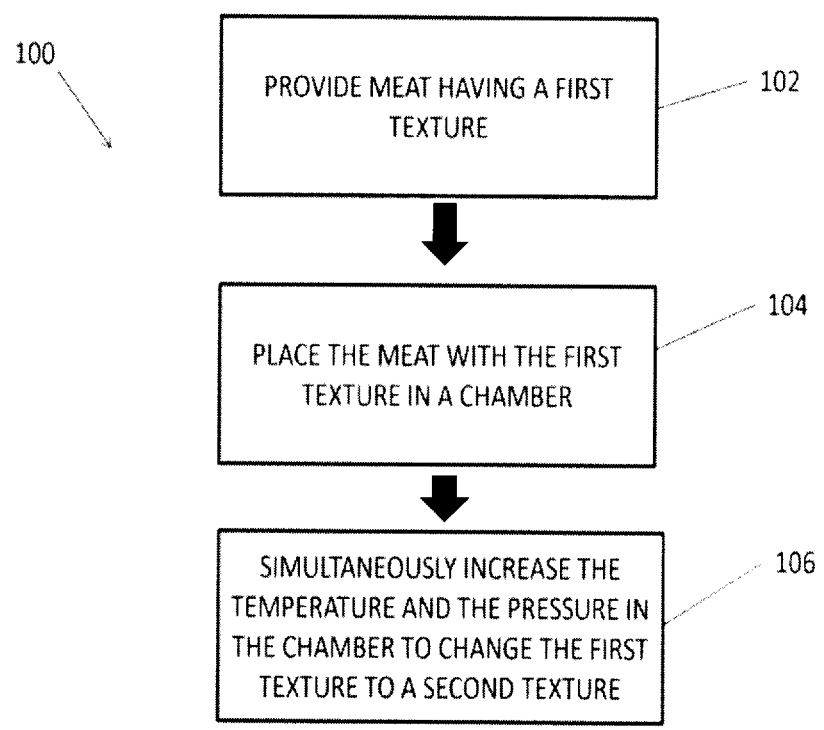
FIG. 1 is a flowchart illustrating a method of preparing a meat product, according to one embodiment.

I. Overview of Methods for Producing Texturized Meat Products

Various embodiments disclosed herein relate to methods for producing shelf-stable, hermetically-packaged meat products (e.g., seafood products) which originate from ingredients having a first texture comprising loosely bound or unbound pieces of meat, e.g., meat flakes, loose pieces or chunks of meat, bits or small pieces of meat, etc. The ingredient meats can comprise any suitable type of meat, such as beef, pork, poultry meats, seafood meats or combination thereof. The poultry meats can be selected from chicken, turkey, duck or other similar meats or combination thereof. The seafood meats can be selected from shrimp, crab, shellfish, fish meats or combination thereof. The meat with the first texture can comprise any suitable quality of meat, including high-quality meat as well as relatively low-quality meat. The meat with the first texture is processed with a combinatorial method of high pressure and temperature process (HPTP) in order to convert the first texture (e.g., loosely-bound or unbound pieces of meat) into a newly formed second texture with desirable characteristics including but not limited to texture, firmness, elasticity, ability to be sliced juiciness and flavors. In this invention, the ability to be sliced means a texture in which a consumer can easily slice or cut the meat into solid, unified portions.

The final meat product, e.g., the meat product having the second texture, can exhibit textural properties of uniformly bound or intact piece of meats that can be sliced, formed or shaped, e.g., a texture which has ham or sausage-like properties. Various embodiments disclosed herein relate to the simultaneous application of HPTP in combination to raw meat materials in any preferred containers (e.g., a can, pouch, or wraps) that is hermetically sealed. For example, various embodiments relate to a combinatorial method for HPTP of meats such as fish or seafood. The HPTP processes disclosed herein can cause meats having the first texture of loosely bound or unbound pieces of meats to uniformly bind together to form a meat product having the second texture, in which the meat product comprises a unitary body of meat that can be sliced or cut easily with a suitable cutting device i.e. a blade.

Various embodiments relate to a novel technique for texturization of food structure in order to be easily sliced, cut, cubed or shaped into any form in order to create a more desirable or pleasurable eating experienced (e.g., similar to the sliced ham structure for a sandwich or the cylindrical shape of a hotdog). Furthermore, the embodiments disclosed herein can also result in the meat products having a long shelf-life at ambient temperature such that the final meat product can be easily stored or transported without the need for refrigeration or freezing (unlike conventional ham or sausage which requires refrigeration). Moreover, the meat product according to this invention is ready to eat without any further cooking prior to consumption (unlike hot dogs which are refrigerated and pre-cooked prior to consumption). Since HPTP well time (process time) is shorter than the cooking time required for a traditional retort or canning procedures, the HPTP processes according to this invention advantageously produce fewer compounds that negatively affect the quality of the meat.

Thus, there is a growing need for a sterilization and texturizing processes whereby loosely bound or unbound pieces of meat (e.g., meat flakes or muscle pieces that tend to fall apart when sliced) can be made firmer and bound into a solid body or steak-like piece which sliceable and/or cut-able into various shapes or forms. Various embodiments disclosed herein can also provide a method for making shelf-stable meats that have acceptable microbial, color and/or other sensory properties. The embodiments disclosed herein can provide a commercially practicable method for shelf-stable meat and seafood by-products that otherwise are discarded as low-value products. Another objective of disclosed embodiments is to texturize meat and meat analog products such as bologna, sausage, bacon bits and tofu-like products from various types of meats as indicated above. Still a further object of the disclosed embodiments is to provide a technique that increases the food yield and to reduce waste products of a food processing operation. A further objective of the disclosed embodiments is to provide an environmentally attractive method for new food packages. These and other advantages will be apparent to those skilled in the art from the description that follows. A further objective of the disclosed embodiments is to provide the meat product with improved characteristics including but not limited to texture, firmness, elasticity, ability to be sliced juiciness and flavors. For instance, the said improved flavors is caused by the reduction or removal of undesirable flavors.

FIG. 1 is a flowchart illustrating a method 100 of preparing a meat product, according to one embodiment. The method 100 begins with a step 102 in which meat having a first texture is provided. The meat having the first texture can comprise a plurality of loosely-bound or unbound pieces of the meat. For example, as used herein, loosely-bound or unbound pieces of meat can refer to portions of meat which are separated from one another and/or portions of meat which are connected together in a non-compact manner. As an example, a loosely-bound piece of meat can comprise portions of meat loosely connected by tendon or muscle matter, flaky meat portions, and/or stringy meat portions. The meat can be any preferred type of meat, such as beef, pork, poultry meats, seafood meats or combination thereof. The poultry meats can be selected from chicken, turkey, duck or other similar meats or combination thereof. The seafood meats can be selected from shrimp, crab, shellfish, fish meats or combination thereof. The said fish meat can be selected from tuna, salmon, sea-bass or combination thereof, preferably the fish is tuna. The meat can comprise muscle materials, organ materials, skin materials, and/or any other material from the animal being harvested for the meat. The meat having the first texture can be raw, partially or completely cooked. In some embodiments, the meat having the first texture can be only partially cooked. In some embodiments, the meat having the first texture can be fully cooked. In some embodiments, the meat having the first texture may not be cooked at all.

Moving to a step 104, the method 100 can comprise placing the meat with the first texture in a chamber. The chamber can be selected from any suitable type of chamber, such as a pressure vessel. The chamber can be coupled with various heating and/or pressure elements or actuators which can controllably adjust the temperature and/or pressure within the chamber. In some embodiments, the meat with the first texture can be packaged within a sealed container before being placed in the said chamber. For example, the meat with the first texture can be placed in a vacuum-sealed plastic bag or in a can. In some embodiments, the meat can be packaged together with a liquid such as water or brine. In various embodiments, other ingredients, such as seasonings, can be additionally mixed with the meat. In other embodiments, the meat may be packaged without any other ingredients.

In a step 106, the temperature and pressure in the chamber can be simultaneously increased to change the first texture to a second texture. The second texture can comprise a single unified body of meat which is sliceable or cut-able with a blade. For example, as explained above, actuators and/or heating elements may be activated to increase the temperature and pressure in the chamber to predetermined levels. In some embodiments, the temperature in the chamber can be increased to a temperature above 70° C. but not exceeding 150° C. In some embodiments, the temperature in the chamber can be increased to a temperature in a range of 100° C. to 150° C., or more particular, in a range of 110° C. to 130° C.

In some embodiments, the pressure in the chamber can be increased to at least 300 MPa. For example, in some embodiments, a pressure within the said chamber is between 300 MPa to 650 MPa, or more particularly, between 500 MPa to 650 MPa. The meat can remain in the chamber at the elevated temperature and pressure for a duration suitable for allowing the second texture to be formed which is also sufficient for sterilizing the meat, e.g., for a duration sufficient to kill or neutralize dangerous bacteria in the meat. For example, the meat can remain in the chamber at the elevated temperature and pressure for duration in a range of 1 minute to 10 minutes, or more particularly, in a range of 1 minute to 2 minutes. In some embodiments, the meat can remain in the chamber at the elevated temperature and pressure for the duration of 2 minutes to 4 minutes.

Thus, the embodiment illustrated in FIG. 1 can advantageously apply a combinatorial method of HPTP to transform meat from a first texture which is loosely-bound or unbound to a second texture which has improved characteristics i.e. the meat product is sliceable or cut-able. It should be appreciated that the meat with the first texture may be generally undesirable to eat, because the texture may be loose and stringy, the flavors may be unappetizing, and poor taste associated with lower quality meats may be drawn out by the first texture. Converting the first texture to the sliceable second texture can significantly improve the taste of the meat and can enable consumers to easily slice, dice, or otherwise cut the meat product into desirable servings. For example, the sliceable unitary meat body of the second texture can have a firmness which is suitable for slicing. In some embodiments, the second texture can have firmness in a range of 1.5 kg-f to 10 kg-f.

Furthermore, the meat with the second texture may not need to be refrigerated or frozen during shipping, sale, and storage. The meat with the second texture may also be eaten without further cooking or processing by the consumer. Thus, after the HPTP process, the meat product can be stocked on store shelves without refrigeration, and the meat product can be consumed without cooking immediately after purchase. In some embodiments, the second texture can have a non-refrigerated, room temperature shelf life of greater than 2 years in which the meat is safe for human consumption.

II. Example Characteristics of the Methods According to this Invention

The methods and systems disclosed herein relate to the innovative concept of inducing a muscle fiber gel network by providing thermal and pressure energy to create an irreversible structural transformation of (protein of gel). The kinetics of protein denaturation by temperature and pressure show pressure (P) and temperature (T) combinations that could provoke or promote either pressure or temperature denaturation. Gibbs free energy is a function of P and T as shown in equation (1):

$$d(\Delta G) = -(\Delta S)dT + (\Delta V)dP \quad (1)$$

where $d(\Delta G)$ is the partial molar Gibbs free energy between the denatured and the native state, $\Delta S$ is entropic change, $\Delta V$ is volume change, expressed as a function of T and P. The volumetric change can be expressed as:

$$\Delta V = \Delta V° + \Delta\alpha(T-T_o) - \Delta\beta(P-P_o), \quad (2)$$

where $\Delta\alpha$ is thermal expansion factor, $\Delta\beta$ is the compressibility factor, and $\Delta V$ and $\Delta V°$ are volume change at process and reference T, respectively. This equation can be applied to more complex system such as proteins. The compressibility term is a thermodynamic quantity relevant to protein where volume fluctuations due to T and P change are relatively large for the denaturation.

Figure 2:
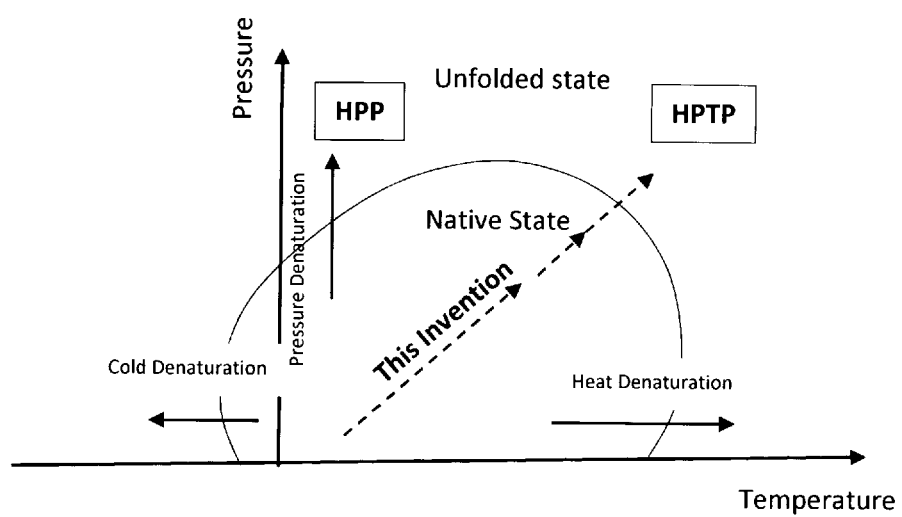
FIG. 2 is a graph showing the relationship between protein denaturation, temperature, and pressure.

FIG. 2 is a graph showing the relationship between protein denaturation, temperature, and pressure. The effects of pressure and temperature on protein denaturation, in general, involve hydrogen bonding (as well as other non-covalent bonds depending on the proteins) which stabilizes the intermolecular network of the unfolded protein. The formation of a network from a thermal or heat process is caused by protein unfolding which is an irreversible process. Pressure-induced unfolding is only partially reversible, which plays an important role in triggering aggregation. The aggregates from pressure processes may be reversible. With a combination of HPTP (e.g., greater than or equal to 300 MPa and greater than or equal to 70° C.), the aggregates which are formed may be stable, depending on the relative native ←→ denatured state of the proteins (e.g., the diagonal line shown in FIG. 2). Hence, the use of HPTP processes applied to muscle foods or protein systems can lead to a formation of firmer or harder meat, as hydration in enhanced (e.g., molecular volume increase) to yield stable and firm meat products.

When conducted in accordance with the example embodiments disclosed herein, the HPTP processes for meat products can enable the binding of loose pieces of meats to form a firm and meat product that maintains a pleasing color and aesthetic properties. Further, the HPTP processes disclosed herein can form meats having a firm texture that allows slicing and cutting into various shapes and forms.

The embodiments disclosed herein may be particularly suited for seafood flakes and meats such as fish, shrimp, crab meats, etc. However, the methods disclosed herein may also be suited for other meats including, but not limited to, beef, pork, poultry meats, seafood meats or combination thereof. The methods disclosed herein may also be suited for other non-muscle proteins, such as internal organs, blood, and proteins extracted from bones as well as from other parts of the body. High quality food is considered synonymous with healthy food by consumers. Especially, healthy meat products are characterized by lower content of fat, salt, additives, and preservatives. High pressure process is a preservation technology that is free from chemical additives, only mildly destructive for food but eliminate pathogenic and spoilage microorganisms. One strategy to obtain high quality meat products is to replace or reduce the amounts of the non-healthy ingredients with some healthy and functional ingredients, thereby resulting in improved both quality and eating characteristics. Introduction of seasonings to HPP process in meat products has been shown to improve physicochemical, microbiological, and sensory properties. High pressure with seasoning or marinating is the HPP process in product with adding salt, herbs, or spices to food to enhance the flavor. Seasonings may include but not limited to herbs and spices, which are themselves frequently referred to as "seasonings. Salt may be used to draw out water, or to magnify a natural flavor of a food making it richer or more delicate, depending on the dish. This type of procedure is akin to curing. For instance, sea salt (a coarser-grained salt) is rubbed into chicken, lamb, fish and beef to tenderize the meat and improve flavor. Other seasonings like black pepper and basil transfer some of their flavor to the food. Infused oils are also used for seasoning. There are two methods for doing an infusion—hot and cold. Olive oil makes a good infusion base for some herbs, but tends to go rancid more quickly than other oils. Infused oils should be kept refrigerated. A well designed HPP parameter may combine seasonings that complement each other. In addition to the choice of herbs and seasoning, the pressurization timing will affect the intensity of seasoning or flavor in the products. High pressure processing (HPP) of foods mainly utilizes flexible packaging materials for commercial products. Many materials have been evaluated for their adequacy in the process. There are a number of integrity requirements for these packaging materials that must be complied with for acceptance and use in different product applications. These include visual integrity, gas permeability, seal and physical strength properties, and global migration of packaging components into the food, some of which are specific to either refrigerate or shelf-stable products. Different laminate options reported in the literature were reviewed in this article with the aim of classifying suitable packaging materials for HPP at both low and high-temperature conditions according to these requirements. Packaging materials currently utilized in industry are also listed. They have shown that polypropylene (PP) and polyethylene (PE) undergo compression heating greater than water under various temperature and pressure conditions up to 750 MPa. In particular, the temperature increase with pressure was not linear and, therefore, the relative increase with respect to water depended on the pressure range selected as well as the initial temperature. For instance, PE showed higher temperatures than water under all temperature High Pressure conditions throughout the whole pressure range. In contrast, while temperature of PP remained higher than that of water throughout the pressure range at lower temperature conditions, the compression heating curve intersected with water at 500 MPa at high temperature conditions. Other authors have observed a compression temperature increase of 4.5° C./100 MPa on PP.

III. Examples for the Method According to this Invention

Various experiments were conducted to demonstrate the efficacy of the HPTP processes disclosed herein. In particular, yellowfin tuna meat with a first texture (e.g., loosely-bound or unbound meat pieces) was packaged in a sealed bag together with 1.5% brine solution and placed into a pressure vessel or chamber. The pressure and temperature were simultaneously increased to convert the first texture to a second texture which is sliceable. Results from the experiments illustrate that there are obvious differences in texture and overall quality of yellowfin tuna processed in 1.5% brine solution by HPTP (e.g., at a target pressure of 600 MPa and a target temperature of 121° C.), as compared with the texture and quality of yellowfin tuna processed using a convention retorting method (at a target temperature of 121° C.). Furthermore, experiments compared the effects of pre-process preparation, e.g., the effects of starting with raw tuna as the original ingredient versus starting with a double cooked tuna product (e.g., steamed at 70° C.). The experiments also compared the visual properties of yellowfin tuna processed by HPTP methods versus conventional retort methods, e.g., the ability to be sliced and cohesiveness of the meat product.

A. Tuna Preparation

Fresh yellowfin tuna steaks (200 g, approximately 1-inch thick) were sourced from a fish market prior to processing. The steaks were stored at 4° C. until the beginning of the experiment. Tuna samples were prepared in one of two ways prior to processing. First, Raw Pack tuna samples were packed in a raw condition before the sterilization. Second, Double Cook tuna samples were steamed in a steamer set to 70° C. until the core temperature reached 60° C. Both the Raw Pack and Double Cook tuna samples were packed into clear, retort pouches filled with 100 mL of a 1.5% brine solution or Extra virgin olive oil (Moro El primero extra virgin olive oil, Spain) was purchased from a local supermarket. Brine solution (1.5%) was prepared from a food grade salt, which were then sealed by vacuum in an Omnipack Pro 460™ vacuum packager. Thus, the Raw Pack tuna samples were packed raw before sterilization. The Double Cook tuna samples were steamed and then packed into the pouches or bags before sterilization.

B. Processing and Testing Parameters

1. Conventional Retort Processing:

A single retort process was used to conventionally sterilize the Raw Pack and Double Cook tuna samples. A Steriflow™ retort was programmed to reach a target maximum temperature ($T_{ref}$) of 121° C. and to achieve a target process thermal lethality of approximately 6 min (i.e., $F_{121.1° C.}$ or $F_0$ of 6 min; see Table 1). Skilled artisans will appreciate that $F_0$ or $F_{121.1° C.}$ is the time (in minutes) equivalent for achieving a commercial sterility ensuring 12 log cycle reduction of microorganisms. The temperature of a representative sample at the slowest heating point in the retort was recorded throughout using a thermocouple inserted into the center of the tuna steak sample.

2. Sterilization by HPTP Processing:

Two HPTP processes were conducted for processing the Raw Pack and Double Cook tuna steak samples. In both cases, a maximum pressure of 600 MPa was set and a $T_{ref}$ of approximately 121° C. was set. The first process, denoted HPTP1 herein, aimed to deliver a thermal lethality of approximately 6 min (i.e., $F_{121.1° C.}$ of 6 mins) with a holding time of 3 min. The second process, denoted HPTP2 herein, aimed to deliver a thermal lethality of approximately 3 min (i.e., $F_{121.1° C.}$ of 3 min; see Table 1) with a hold time of 1.5 min. Given the capacity of the high pressure vessel in which the meats were processed, the Raw Pack and Double Cook tuna samples were not be processed together. Therefore, a total of four HPTP processes were performed. Table 1 illustrates the processing specifications for the experiments for the Raw Pack tuna and the Double Cook tuna samples.

TABLE 1

Description of product processing specifications and number of samples for testing

| Name | Pressure (MPa) | Holding time (min) | Intended $F_0$ (min) | Number of sample Raw Pack* | Double Cook** |
|---|---|---|---|---|---|
| Retort | 0 | 6 | 6 | 8 | 8 |
| HPTP 1 | 600 | 3 | 6 | 8 | 8 |
| HPTP 2 | 600 | 1.5 | 3 | 8 | 8 |

Remarks:
*Raw Pack tuna samples were packed raw whilst
**Double Cook tuna samples, tuna steaks were first steamed in a steamer set to 70° C. until a core temperature of 60° C.

HPTP processes were performed in a vertical 35 L HPP unit (manufactured by Avure Technologies, USA) using water as the compression medium. Prior to HPTP processing, samples were loaded into a stainless steel sample carrier, and the sample carrier was transferred to the pressure vessel and processed at 600 MPa for 1.5 or 3.0 min, respectively, at 95° C. Post-process, samples were cooled to approximately 20° C. in a recirculating, chilled (~2° C.) water bath then transferred to a cool room set at 3° C. until testing.

To record the approximate temperature of samples in each process, a pressure resistant shell containing a Thermochron iButton® DS1922T temperature logger (Maxim Integrated Products, Inc., Sunnyvale, CA, USA) was placed alongside samples throughout the process, from pre-heating to cooling.

3. Thermal Lethality for HPTP and Retort Processes:

In order to compare the thermal component of each process delivered to the tuna steak samples, the $F_{121.1° C.}$ or $F_0$ value (the integrated thermal lethality) was calculated using the thermal profile from each process by integrating the following Trapezoidal Integration Method, where T(t) is the recorded sample temperature during the time interval (t) and $T_{ref}$ is the reference temperature at which thermal lethality is selected to be measured. In this study, 121.1° C. was selected as $T_{ref}$. A theoretical $z_T$ value (the temperature difference required to result in a 10-fold change in the heat resistance) of 10° C. was used in all calculations. Both $T_{ref}$ and $z_T$ values were selected based on the standards adopted by industry for the thermal sterilization of low-acid canned foods.

4. Effect of Media for High Pressure and Temperature Process (HPTP) Treatments:

Response surface methodology was used to investigate the simultaneous effects of processing temperature and pressure on texture of tuna following combined high pressure and temperature process (HPTP). Face centered Central Composite Design was used in the experiments with two independent variables; temperature and pressure and a third categorical variable processing medium (Brine or olive oil). Three levels of the two parameters (temperature and pressure) and two levels of the third categorical variable were investigated. The experimental design is presented in Table 2. The temperature and pressure combinations were designed to vary between 20 and 120° C. and 300 and 600 MPa, respectively.

TABLE 2

Description of experimental design for testing

| | Pressure (MPa) | Temperature (° C.) | Processing medium (categorical variable) |
|---|---|---|---|
| −1 | 300 | 20 | 1.5% Brine |
| 0 | 450 | 70 | |
| 1 | 600 | 120 | Olive oil |

The samples and the processing water were kept at a pre-determined initial temperature so as to get to the actual processing temperature after compression. For instance, the initial temperature of the samples that were processed at 600 MPa and 20° C. were maintained at 5° C. The processing time was kept at 1.5 min since the previous result showed that increasing the processing time did not have a significant effect on texture. Samples were cooled in a recirculating chiller (~2° C.) following processing and kept in ice-water in a refrigerated room (~4° C.) until analysis. Control samples were prepared in the same way and retorted at $F_o$=6 min as reference.

5. Texture Analysis:

A TA-XT™ texture analyzer (manufactured by Texture Technologies Corp. of Hamilton, MA) was used to perform compression testing on the processed tuna samples. Using a compression plate, processed tuna samples were compressed to 50% of their original height for one cycle. Hardness (force in kg) was obtained directly from the acquired force-time curve. Three samples of tuna from each combination of preparation and processing were analyzed.

C. Results of Experiments

1. Thermal Lethality of HPTP and Retort Processes:

Table 3 below lists the delivered thermal lethality for the sterilization experiments described herein. Using the thermal profiles recorded during each process, the $F_{121° C.}$ or $F_0$ value for each sample was calculated (see Table 3). The retort process yielded an $F_o$ of 5.7 min, which was close to the 6 min targeted $F_0$. The HPTP processes aimed to reach 121° C.; however, in all cases, the maximum temperature was at least 125° C., which increased the expected $F_0$ values beyond the desired 6 min and 3 min for HPTP1 and HPTP2 processes, respectively. It should be noted, however, that for temperature measurements during HPTP processing, readings were taken in the fluid surrounding the samples and are not necessarily reflective of the actual temperature at the surface and in the core of the tuna steak samples. In addition, the $F_0$ values may vary for individual samples, depending on their location in the pressure vessel since temperature may not homogeneous throughout a pressure vessel.

The quality difference in HPTP and retort processed tuna indicated that HPTP2 samples were more closely matched to the retorted samples based on the thermal lethality delivered, with an estimated $F_0$ of approximately 4.7 min and 5.7 min, respectively. HPTP1 processed tuna samples had notably higher thermal load delivered to them ($F_0$ of approximately 8.0 min) than that delivered by retorting and are not ideally matched for comparison to retorted samples on that basis.

TABLE 3

Description of product processing specifications and delivered thermal lethality ($F_0$)

| Sample type | Process details (Pressure/max. temperature/hold time) | Actual $F_0$ (min) |
|---|---|---|
| 'Raw pack' yellowfin tuna in brine | HPTP 1 - 600 MPa/125° C./3.0 min | 7.0^ |
| | HPTP 2 - 600 MPa/125° C./1.5 min | 4.4^ |
| | Retort - N/A/121° C./N/A | 5.7 |
| 'Double Cook' yellowfin tuna in brine | HPTP 1 - 600 MPa/126° C./3.0 min | 9.8^ |
| | HPTP 2 - 600 MPa/126° C./1.5 min | 4.9^ |
| | Retort - N/A/121° C./N/A | 5.7 |

^As determined using temperature readings taken in the fluid surrounding samples; lower $F_0$ values may have been delivered to each individual sample, depending on location in the pressure vessel.

2. Effect of Processing on Tuna Texture and Appearance:

Table 4 summarizes the effect of preparation and processing on the texture of the processed yellowfin tuna. The HPTP processes produced harder samples (e.g., greater force) compared to retort processes, and which is independent of the thermal load delivered. For example, HPTP2 samples (lower $F_0$ values than HPTP1 samples) were found to be less hard than HPTP1 samples. This data on may indicate that the exposure time to 600 MPa/125° C. greatly influenced (i.e., increased) the degree of hardening of the tuna meat. While the difference in force measured by process type was statistically significant at the 99% confidence interval (P<0.01), sample preparation (i.e., 'Raw Pack' Vs. 'Double Cook') had little or no effect on the final texture (P>0.05).

TABLE 4

Effect of sample preparation and processing on texture of yellowfin tuna

| | Force (kg-f) * | |
|---|---|---|
| Process | Raw Pack | Double Cook |
| Retort ($F_0$ 6 min) | 0.65 ± 0.17 | 0.89 ± 0.67 |
| HPTP1 ($F_0$ 3 min) | 3.32 ± 1.48 | 2.93 ± 0.63 |
| HPTP2 ($F_0$ 6 min) | 5.27 ± 4.49 | 7.29 ± 3.38 |

Figure 3A:
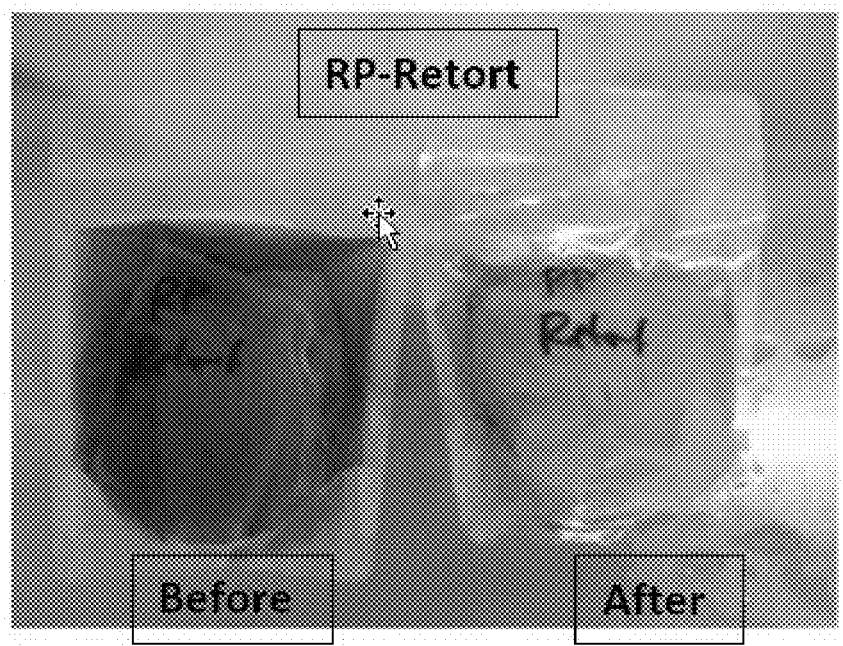
FIG. 3A is an image of a Raw Pack (RP) yellowfin tuna sample before and after processing with conventional retort methods.
Figure 3B:
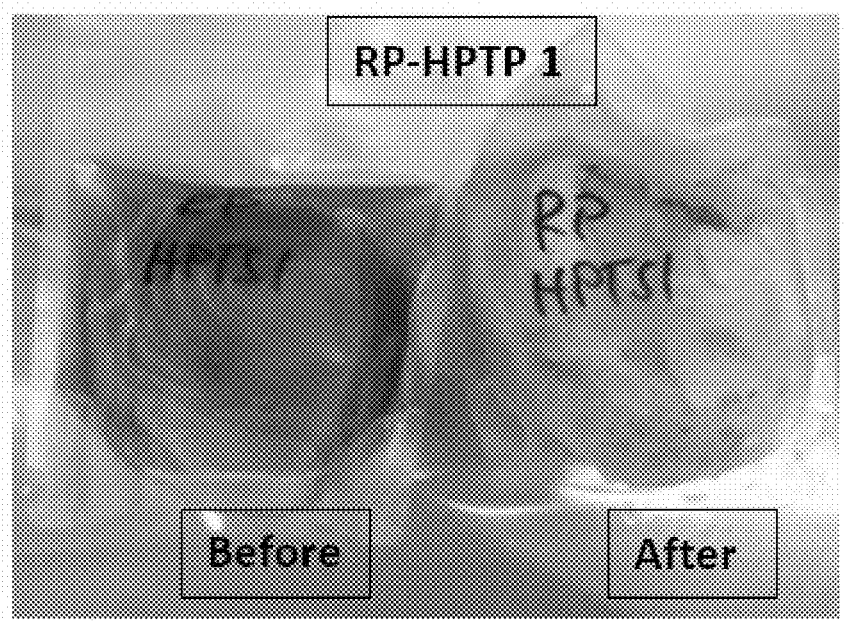
FIG. 3B is an image of a Raw Pack (RP) yellowfin tuna sample before and after processing with the HPTP 1 methods disclosed herein.

FIG. 3A is an image of a Raw Pack (RP) yellowfin tuna sample before and after processing with conventional retort methods. FIG. 3B is an image of a Raw Pack (RP) yellowfin tuna sample before and after processing with the HPTP1 methods disclosed herein. As shown in FIGS. 3A and 3B, the RP sample sterilized using the HPTP1 processing technique has a similar appearance to the RP sample sterilized using the retort process in terms of color. However, the appearance of a coagulated protein-type substance in the liquid surrounding the samples, as well as significant textural changes, clearly distinguishes the retort-processed sample from the HPTP-processed sample. For example, the tuna product formed with the HPTP1 process yielded a sliceable tuna product suitable for, e.g., sandwiches. This Figure shows the effect of processing on the appearance of Raw Pack Yellowfin Tuna from both retort and HPTP processes. Sample from HPTP processing has similar appearance to retorted tuna in terms of color, but the appearance of a coagulated protein type substance in the liquid surrounding samples as well as significant textural changes that clearly distinguishes one from the other, for example, a sliced tuna product suitable for sandwiches.

Figure 4A:
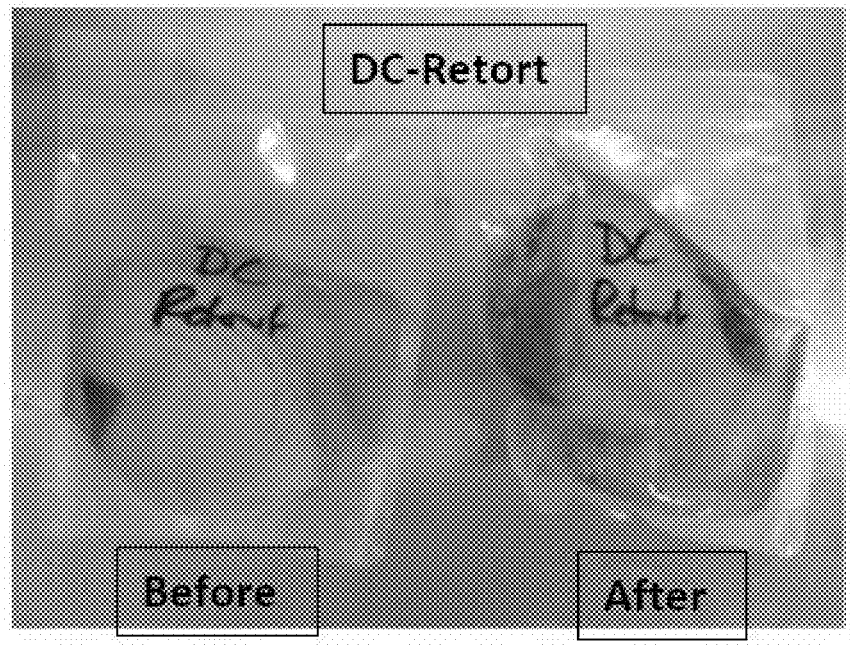
FIG. 4A is an image of a Double Cook (DC) yellowfin tuna sample before and after processing with conventional retort methods.
Figure 4B:
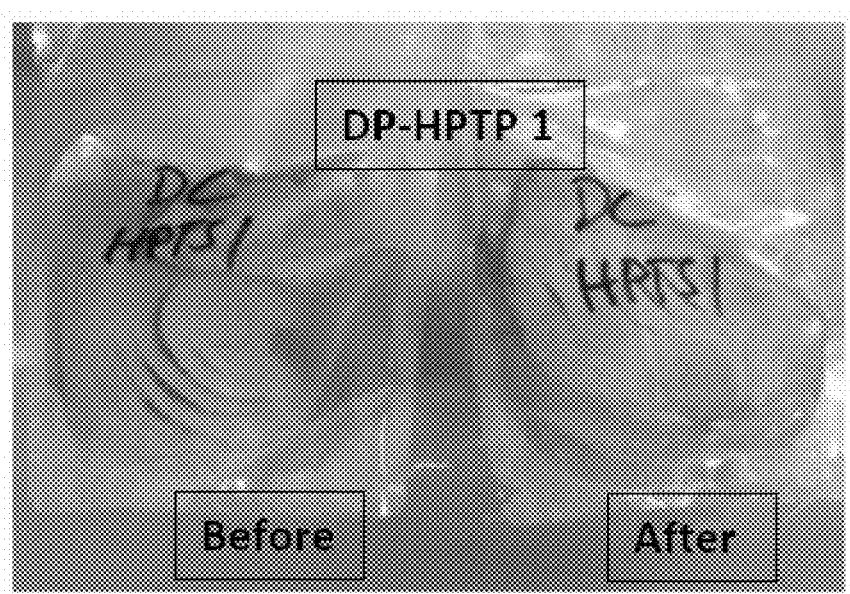
FIG. 4B is an image of a Double Cook (DC) yellowfin tuna sample before and after processing with the HPTP1 methods disclosed herein.

FIG. 4 is an image of a Double Cook (DC) yellowfin tuna sample before and after processing with conventional retort methods. FIG. 4B is an image of a Double Cook (DC) yellowfin tuna sample before and after processing with the HPTP 1 methods disclosed herein. As shown in FIGS. 4A-4B, the sample from the HPTP 1 method has a generally similar appearance to the sample formed from the retort method in terms of color. However, the tuna sample produced by the HPTP1 process has undergone significant textural changes that clearly distinguish the two processes. For example, the tuna product formed by the HPTP1 process is a unified body of meat which is sliceable by the consumer. This Figure shows the effect of processing on the appearance of Double Cooked (DP) Yellowfin Tuna from both retort and HPTP processes. Sample from HPTP processing has similar appearance to retorted tuna in terms of colour, but which has undergone significant textural changes that clearly distinguishes one from the other.

Figure 5:
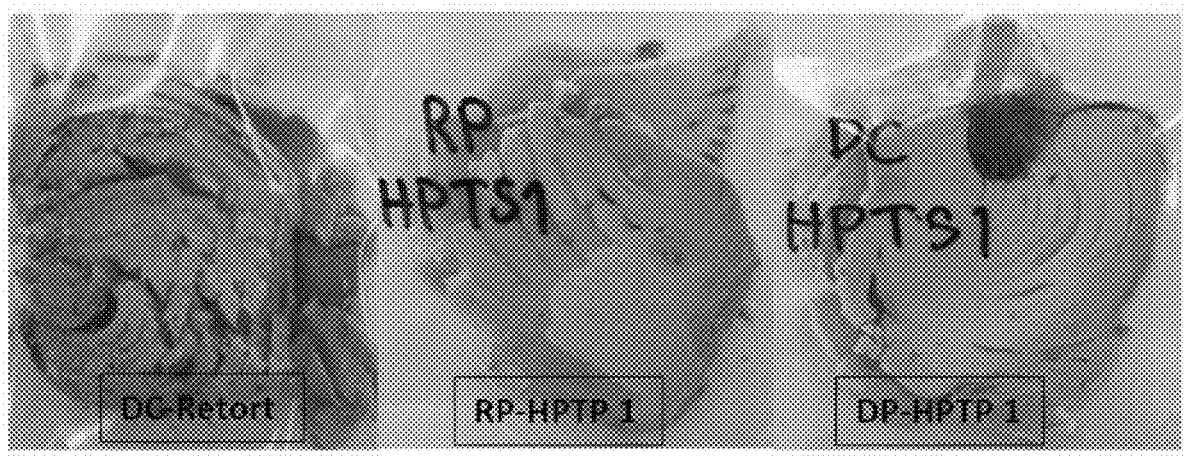
FIG. 5 is an image comparing the appearance of Double Cook tuna samples made with a conventional retort process (DC-retort) to Double Cook (DC HPTP 1) and Raw Pack (RP HPTP1) tuna samples made with the HPTP1 process, according the one embodiment disclosed herein.

FIG. 5 is an image comparing the appearance of Double Cook tuna samples made with a conventional retort process (DC-retort) to Double Cook (DC-HPTP1) and Raw Pack (RP-HPTP1) tuna samples made with the HPTP 1 process, according to one embodiment disclosed herein. The samples from HPTP1 of both Raw Pack and Double Cook tuna show a texture different from the tuna product formed by a conventional retort process. For example, the tuna product formed by the conventional retort process (DC-Retort) could not be sliced into a reasonably fine or stable cut of meat because the meat separated and fell apart (e.g., was not cohesive). By contrast, the tuna product formed by the Raw Pack (RP) HPTP1 and the Double Cook (DC) HPTP1 processes were cohesive and tightly bound so that the meat could be sliced into sheets with the slice surface of the meat showing binding. The resulting sliced tuna had a consistency which was suitable for sandwiches or other eating applications. This Figure shows the effect of processes on the texture appearance of Yellowfin Tuna. Samples from HPTP of both raw pack and double cooked Tuna show texture different from Tuna retort process that clearly distinguishes one from the other, for example, a sliced tuna product suitable for sandwiches.

Thus, a primary, measureable quality differences between yellowfin tuna samples processed by retort processes and by HPTP processes was the texture. Irrespective of thermal lethality, the HPTP samples were much firmer and more cohesive compared to the visibly softer, flaky texture of the retorted tuna, allowing the HPTP-processed tuna to be sliced or cut. A texture analysis of the HPTP tuna samples demonstrated that all of the HPTP samples had significantly greater measured firmness or force (Force=3.32 and 5.27 kg-f from Raw Pack and 2.93 and 7.29 kg-f from Double cooked at $F_o=3$ and $F_o=6$, respectively) than the retorted samples (Force=0.65 and 0.89 kg-f for raw pack and double cooked, respectively). However, texture was not found to be significantly affected by pre-process preparation (i.e., 'Raw Pack' versus 'Double Cook'). In addition, the exposure time of HPTP processes increased the degree of hardness or firmness of the meat, which was found to improve binding and the ability to be sliced. The appearance of the samples showed that the tuna steaks were generally white, irrespective of processing or preparation. The color of the processed tuna steaks was different in the center (more red) compared to that measured at the surface ($P \leq 0.001$). As explained above, the most salient difference between the retort samples and the HPTP samples was the significant textural differences which that clearly distinguish the processed meat products. Such differences in HPTP-processed tuna may be used in novel products including, for example, a sliced tuna product suitable for sandwiches.

Figure 6:
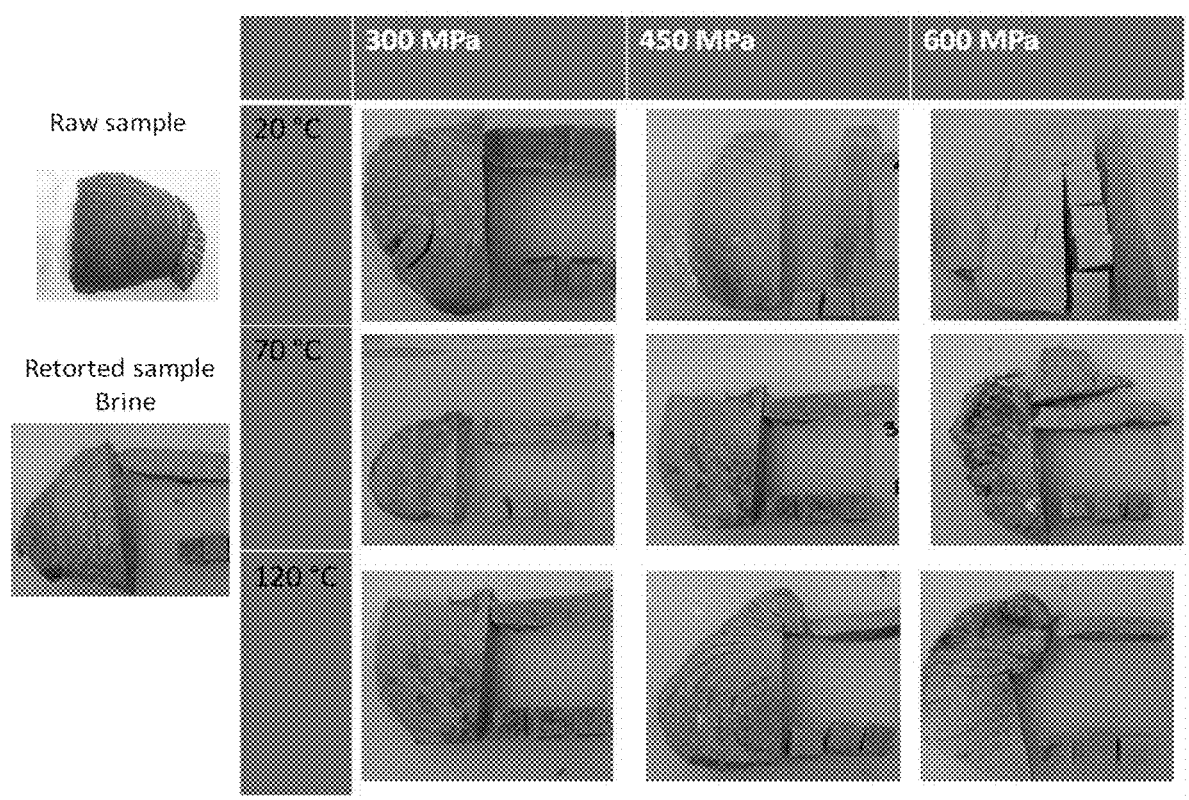
FIG. 6 is showing images of tuna steaks processed at different conditions using 1.5% brine as the processing medium.
Figure 7:
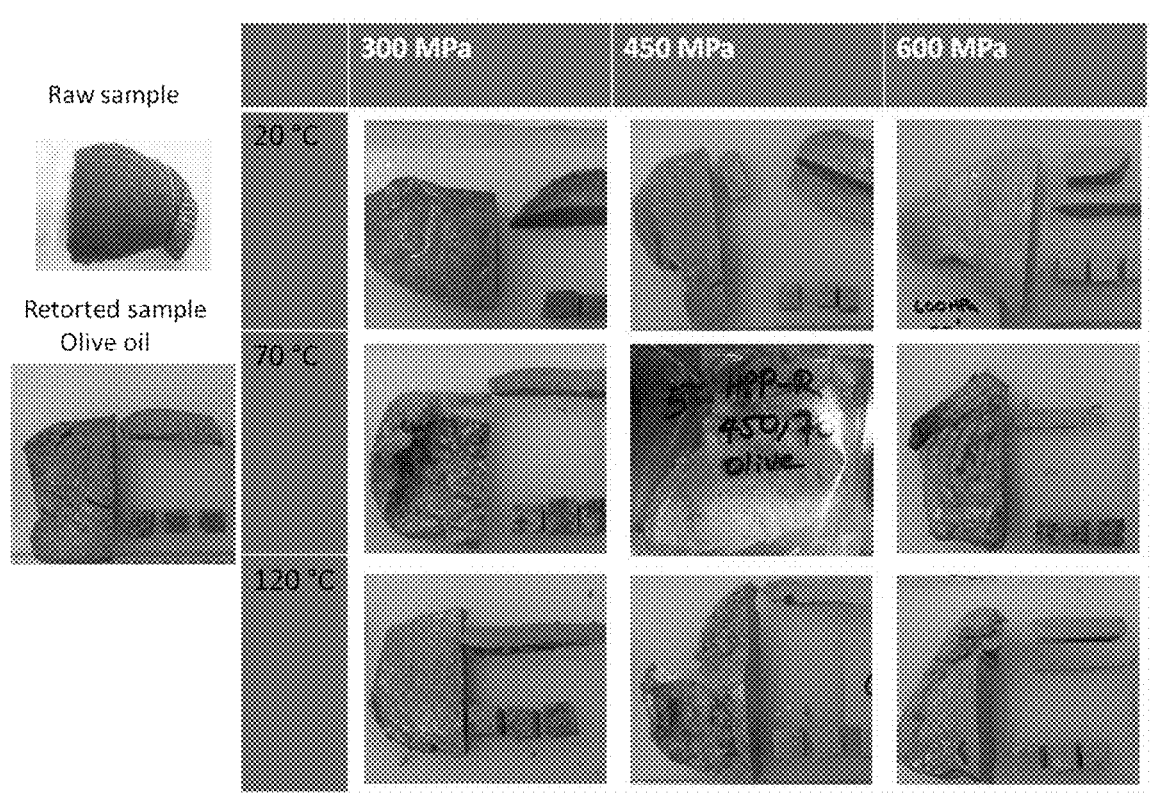
FIG. 7 is showing images of tuna steaks processed at different conditions using olive oil as the processing medium.

High pressure and temperature processing (HPTP) had a significant effect on the visual appearance of tuna samples. The effect was dependent on the applied pressure and temperature as well as the processing media (FIGS. 6 and 7). In all cases, processing temperature had the most noticeable effect. Interestingly, samples that were processed at 20° C. were very close in appearance to that of the raw sample. That was especially the case for samples processed at 300 MPa. On the other hand, the colour of the samples processed at the higher temperatures (70 and 120° C.) was very similar to that of the retorted samples. Overall, samples processed in olive oil media retained the raw tuna colour better than that of brine (FIGS. 6 and 7).

Figure 8:
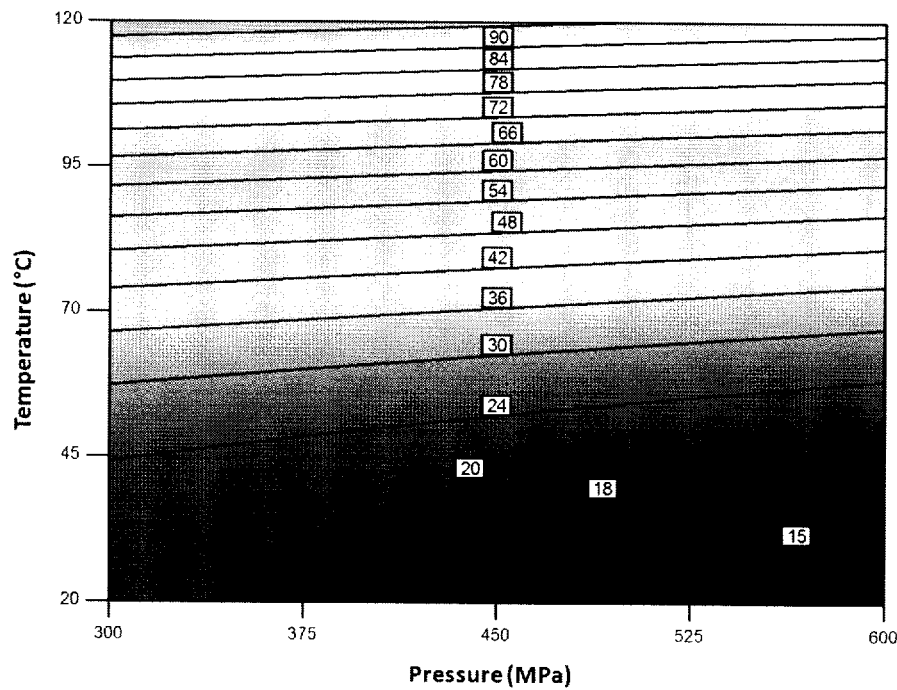
FIG. 8 is a contour diagram describing the effects of combined high pressure and temperature processing (HPTP) on the hardness (N) of tuna steaks after 1.5 minute treatment time.
Figure 9:
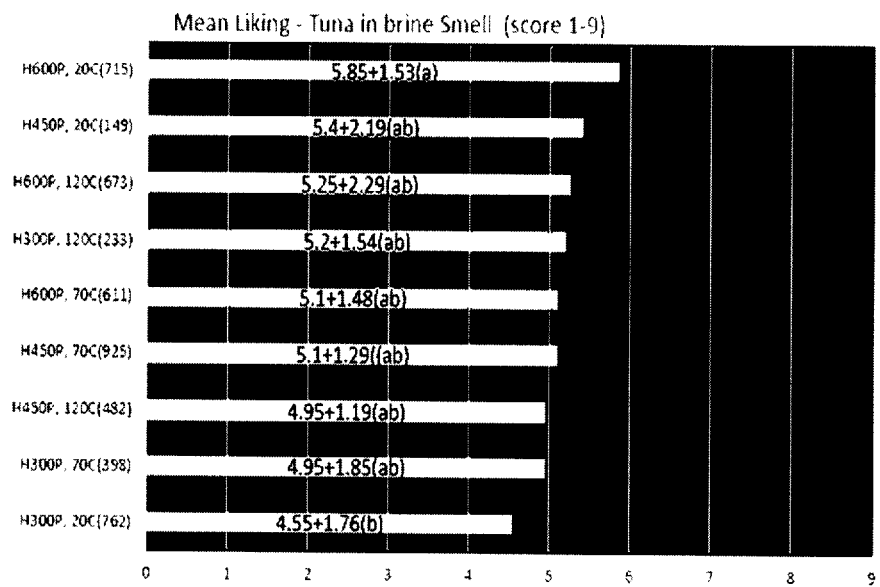
FIG. 9 is showing a mean liking score on Tuna smell describing in each treatments.

High pressure thermal processing (HPTP) had a significant effect on the hardness of tuna samples as confirming. The raw tuna samples had an average hardness of 12.7±4.4N. On the other hand, the HPTP processed tuna samples had an average hardness ranging from 17 to 120 N with 1.3 to 9.4 times increase in hardness compared to the raw sample. In contrast, the highest hardness level obtained after retorting ($F_o=6$ min) was between 23 to 30 N, which was about 3.9 times the hardness of the raw samples. Analysis of variance showed that both processing temperature and pressure had significant ($p<0.05$) effects, while processing media did not have significant effect on hardness (Table 5). Among the variables investigated, temperature had the most significant effect with both the first and second order term significant at $p<0.001$ significance level (Table 5). After eliminating the non-significant terms, the hardness of the tuna steaks subjected to high pressure-thermal processing could be described by the following response surface equation (3).

$$\text{Hardness} = 32.3 - 0.42T - 0.022P + 0.009T^2 \qquad (3)$$

where P and T are processing pressure and temperature respectively. The equation described the effect of processing pressure and temperature on texture of the tuna steak samples very well with a very high coefficient of determination ($R^2=0.9506$). Contour diagrams based on equation 4 describing the effects of pressure and temperature on the hardness of tuna samples are presented on FIG. 8. As can be seen, a significant increase in texture was observed with increase in temperature. Increasing the pressure at constant temperature had a slightly negative effect on the hardness within the investigated pressure range (FIG. 8). High pressure temperature processing (HPTP) can minimize deterioration of taste by decreased by either bacterial or enzymatic degradation of proteins. These results support the theory that HPTP treatment helps to maintain meat freshness via eliminating contaminating microorganisms and protecting against enzymatic degradation of meat proteins. The creating an organoleptic test is usually the first step to determine the acceptability of HPTP Tuna in brine and in oil as compared to Ham slices. Sensory Test was designed for two days session for Tuna in brine and in oil, Sequential monadic serving (complete) was planned for each session, 9 points hedonic scale: Dislike extremely (1)→Like extremely (9). Sensory evaluation indicated that the higher pressure with heat enhanced the overall acceptance in flavor. It has been reported that HP treatment affects many sensory characteristics of Tuna meat which demonstrated that higher pressure treatment affected flavor or aroma pleasantness of Tuna meat as FIG. 9, Tuna meat which had treatment at 600 MPa, Temp=20° C. has better smell liking scores than treatment at 300 MPa, Temp=20° C., significantly at 95% C.I.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A method of preparing a texturized meat product, the method comprising:
    providing meat having a first texture comprising a plurality of loosely-bound or unbound pieces of the meat in an olive oil medium;
    placing the meat with the first texture having an initial temperature in a chamber;
    applying simultaneously heat and pressure to the chamber to allow the initial temperature to rise;
    controlling heat and pressure as independent variables to reach a target temperature of between 110-150° C. and a target pressure of between 500-650 MPa inside the chamber, such that the chamber is coupled with a heating element that independently heats the chamber to the target temperature; and
    maintaining the chamber at the target temperature and the target pressure for a duration sufficient to convert the meat of the first texture to the texturized meat product of a second texture comprising a unitary body of the meat, the second texture having a firmness in the range of 1.5 to 10 kg-f, wherein the firmness of the second texture allows the texturized meat product to be cut and sliced into uniform slices or pieces,
    wherein the meat having the first texture comprises tuna.

2. The method of claim 1, wherein the pressure inside the chamber is between 600-650 MPa.

3. The method according to claim 1, wherein the meat is left inside the chamber for a duration of 1-10 minutes.

4. The method according to claim 3, wherein the duration is in a range of 1-3 minutes.

5. The method according to claim 1, wherein the meat further comprises at least one selected from the group consisting of a beef meat, a pork meat, a poultry meat, and a seafood meat other than the tuna.

6. The method according to claim 5, wherein the meat further comprises at least one poultry meat selected from the group consisting of chicken, turkey and duck.

7. The method according to claim 5, wherein the meat further comprises at least one seafood meat selected from the group consisting of a shrimp meat, a crab meat, a shellfish meat and a fish meat other than the tuna.

8. The method according to claim 7, wherein the meat further comprises at least one of salmon and sea-bass.

9. The method according to claim 1, wherein the meat is added with food additives selected from the group consisting of seasoning agents, herbs, spices, preservatives and combinations thereof.

10. The method according to claim 9, wherein the food additives are added to the meat before or after placing the meat inside the chamber.

11. The method according to claim 9, wherein the food additives are in the form of solid or solution.

12. The method according to claim 1, wherein the meat is sealed in a container before placing inside the chamber.

13. The method according to claim 1, wherein the meat is raw, or partially cooked.

14. The method according to claim 1, wherein the temperature is between 121-150° C.

15. The method according to claim 1, wherein the firmness of the second texture is greater than a firmness of the first texture.

16. The method according to claim 1, wherein the second texture has improved flavors compared to the first texture caused by the reduction or removal of undesirable flavors.

17. The method according to claim 1, wherein a shelf-life of the texturized meat product is at least 4 weeks when stored at temperature below 5° C.

18. The method according to claim 17, wherein the shelf-life of the texturized meat product is at least 18 months when stored at room temperature.

19. The method according to claim 1, wherein applying the heat and pressure to the chamber comprises activating one or more heating elements and one or more pressure elements coupled to the chamber.

20. The method according to claim 1, wherein no heat is applied to the meat with the first texture prior to simultaneously applying heat and pressure to the chamber.

21. The method according to claim 1, further comprising heating the meat in a steamer, and then cooling the steamed meat, prior to placing the steamed meat with the first texture in the chamber.

22. The method according to claim 21, wherein the meat is heated in the steamer until a core temperature of the steamed meat is 60° C.

* * * * *